(12) United States Patent
Tellapaneni et al.

(10) Patent No.: US 10,036,245 B2
(45) Date of Patent: Jul. 31, 2018

(54) FORMATION TESTER INTERVAL PRESSURE TRANSIENT TEST AND APPARATUS

(71) Applicant: Schlumberger Technology Corporation, Sugar Land, TX (US)

(72) Inventors: Prasanna Kumar Tellapaneni, Mumbai (IN); Richard Jackson, Norwich (GB); Sourabh Shukla, Mumbai (IN); Harshad Dixit, Dehradun (IN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 913 days.

(21) Appl. No.: 14/355,820

(22) PCT Filed: Nov. 5, 2012

(86) PCT No.: PCT/US2012/063543
§ 371 (c)(1),
(2) Date: May 1, 2014

(87) PCT Pub. No.: WO2013/067491
PCT Pub. Date: May 10, 2013

(65) Prior Publication Data
US 2014/0316707 A1    Oct. 23, 2014

Related U.S. Application Data

(60) Provisional application No. 61/555,852, filed on Nov. 4, 2011.

(51) Int. Cl.
*E21B 49/00* (2006.01)
*G01V 11/00* (2006.01)

(52) U.S. Cl.
CPC ............ *E21B 49/00* (2013.01); *E21B 49/008* (2013.01); *G01V 11/002* (2013.01)

(58) Field of Classification Search
CPC ..... E21B 49/00; E21B 49/008; G01V 11/002; G01V 9/00; G01N 33/24
See application file for complete search history.

(56) References Cited

U.S. PATENT DOCUMENTS

2004/0133350 A1* 7/2004 Veneruso .................. G01V 1/36 702/6
2005/0270903 A1   12/2005 Ramakrishnan et al.
(Continued)

OTHER PUBLICATIONS

Examination Report issued in AU2012332138 dated Feb. 10, 2015, 2 pages.
(Continued)

*Primary Examiner* — Mohamed Charioui
*Assistant Examiner* — Jeremy Delozier
(74) *Attorney, Agent, or Firm* — Michael Dae

(57) ABSTRACT

A methodology for IPTT (interval pressure transient testing) design which allows estimation of the reliability of the transient tests. A normally distributed random noise is superimposed on analytical pressure profile computed for a given formation, PVT, and gauge metrology. The IPTT success in a particular environment is estimated based on the theoretical pressure derivative and noise superimposed pressure derivative. This approach is repeated for a range of rock, fluid properties, and practical limits, for a successful IPTT.

15 Claims, 14 Drawing Sheets

(56) References Cited

U.S. PATENT DOCUMENTS

2006/0241867 A1* 10/2006 Kuchuk ................. G01V 11/00
  702/13
2009/0276156 A1 11/2009 Kragas et al.
2010/0185393 A1 7/2010 Liang et al.
2012/0253679 A1* 10/2012 Chang ................... E21B 49/088
  702/11

OTHER PUBLICATIONS

International Search Report for International Application No. PCT/US2012/063543 dated Mar. 4, 2013.

Archer, et al. "Effects on Well Test Analysis of Pressure and Flowrate Noise," SPE 77533, presented at the SPE Annual Technical Conference and Exhibition held in San Antonio, TX, Sep. 29-Oct. 2, 2002.

Bertolini, et al. "A Cost Effective and User Friendly Approach for mini-DSTs Design", SPE 122886, presented at the 2009 SPE EUROPEC/EAGE Annual Conference and Exhibition held in Amsterdam, The Netherlands, Jun. 8-11, 2009.

Bourdet, et al. "Use of Pressure Derivative in Well-Test Interpretation", SPE 12777, presented at the 1989, SPE formation Evaluation, June.

Horne "Uncertainty in Well Test Interpretation", SPE 27972, presented at the University of Tulsa Centennial Petroleum Engineering Symposium held in Tulsa, OK, Aug. 29-31, 1994.

* cited by examiner

_US 10,036,245 B2_

FORMATION TESTER INTERVAL PRESSURE TRANSIENT TEST AND APPARATUS

FIELD OF THE INVENTION

Aspects of the invention relate to formation testing of geological stratum. More specifically, aspects of the invention relate to formation testing interval pressure transient testing apparatus and methods.

BACKGROUND INFORMATION

Increased deepwater drilling today requires that expensive drillstem testing operations be optimized by other technologies that provide dynamic information of the formations to be tested. Wireline conveyed interval pressure transient tests (IPTT) are becoming a common practice today for optimizing and designing these expensive tests.

Typically, prior to IPTT, there is limited amount of information available about the reservoir and fluids properties. The fluid property information that is known tends to be generally probabilistic. Optimum design of IPTT tests is a challenge in order to achieve a successful and reliable test. IPTT may be dependent on the noise and on observable flow regimes associated with the pressure buildups. The success and reliability of the tests are not only a function of gauge metrology, but also of the formation deliverability and geometry.

IPTT is typically performed using the formation tester tool that straddles an interval of the target reservoir rock and isolating the interval from the borehole hydraulic pressure. Such a test is illustrated in FIG. 1. The formation fluid from the straddled interval is flowed by using a downhole pump thereby creating a pressure drawdown, which is followed by a buildup. Pressure transient analysis of the acquired data is used to determine various reservoir properties, such as permeability, formation pressure, skin, productivity, etc. Also, IPTT can be configured in various hardware options, such as with or without observation probes, etc., to give additional data that can be used to increase the confidence in the interpretation.

Development of a radial flow regime is desirable for optimum IPTT analysis. Radial flow regime corresponds to a zero slope portion of the Bourdet derivative on the pressure-derivative plot. FIG. 2 illustrates a typical Bourdet flow regime plot. The time of onset and the value of the radial flow regime derivative are primarily dependent on the formation and fluid properties of the tested interval.

An unambiguous identification of the radial flow regime is desirable for getting unique values of critical properties such as permeability, skin, etc. Sometimes, however, no reliable radial flow regime can be identified which can be attributed to:

Formation and fluid properties of the tested interval in which radial flow regime may not initiate in reasonable time. See FIG. 3.
Noise in the pressure signal during buildups; especially in high permeability formation where the signal to noise ratio tends to be low because of flow rate limitations of formation testers. See FIG. 4 where noise in the derivative plot renders reliable identification of radial flow.

As shown in FIG. 5(a), when the permeability is higher, the reservoir reacts faster, and the pressure derivative deviates quickly away from the unit slope storage line and attains the radial flow zero slope trend earlier. Also, the value of the radial flow derivative is inversely related to the permeability. Formation thickness has a similar effect on the pressure derivative as shown in FIG. 5(b). The change in viscosity of the fluid has an inverse effect on the pressure derivative. The ratio of the permeability thickness to fluid viscosity correlates strongly to the value of the radial flow derivative.

FIGS. 5(c) and 5(d) depict the effect of porosity and total compressibility respectively on the pressure derivative plot. It can be seen that these two parameters are weakly correlated to the value of the radial flow derivative and the time of onset of radial flow.

It can be inferred from the sensitivity plots of FIGS. 5(e) and 5(f) that well bore storage constant and skin influence the onset of the radial derivative significantly; however, they have little effect on the value of the radial flow derivative.

Overall there are several parameters that effect the development of various flow regimes on the pressure derivative. For an optimum IPTT design, the effect of these parameters and the expected noise on the pressure derivative should be quantified. Since petrophysical and fluids information available during the planning stage of the IPTT is limited and has certain associated uncertainties, defining and quantifying a holistic effect of these parameters on the development of flow regime is a challenge. Also, each of these parameters, along with the gauge metrology, influences the noise observed on the derivative plot, and quantification of this noise poses further challenges.

Generally, IPTT tests are designed by simulating the pressure response by considering few variations in the flow rate and formation properties. It is very cumbersome and time consuming to consider all the possible variations of the several parameters which influence the pressure derivative flow regimes and limits the scope of this methodology. Moreover, the generally-used methodology is very limited in proposing any mitigation measures to ensure optimum data acquisition during IPTT.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

This disclosure describes a methodology for IPTT design which allows estimation of the reliability of these transient tests. A normally distributed random noise is superimposed on analytical pressure profile computed for a given formation, PVT, and gauge metrology. IPTT success in a particular environment is estimated based on the theoretical pressure derivative and noise superimposed pressure derivative. This approach is repeated for a range of rock, fluid properties, and practical limits until a successful IPTT is identified and presented. Two field examples are presented to validate this methodology.

Figure 7:
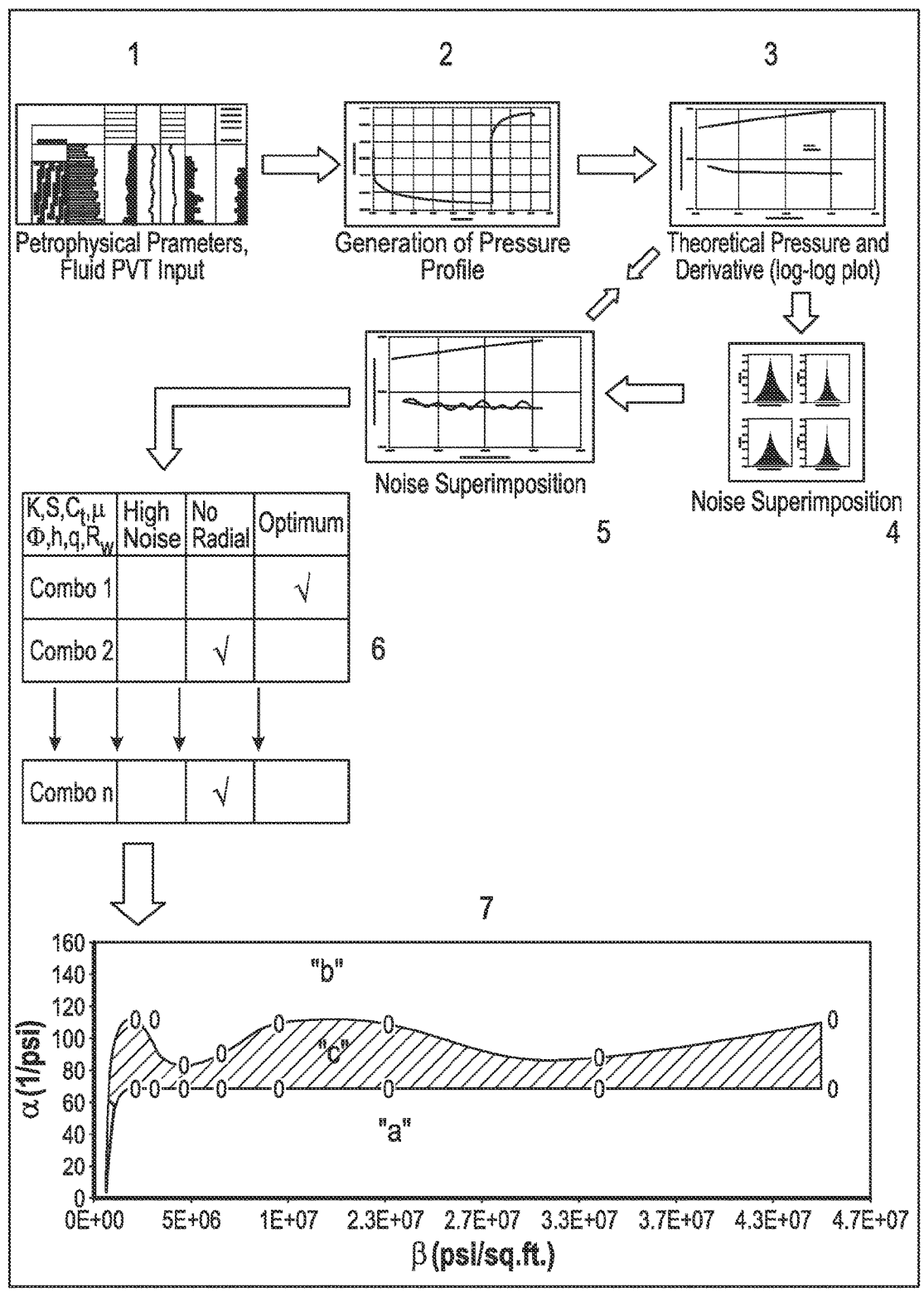
FIG. 7 is a workflow for generating reliability plots.

The proposed methodology estimates IPTT reliability by quantifying the effect of noise on Bourdet derivative. The overall effect of various formation properties is quantified. This is done by generating a two dimensional plot of reliability that is generated considering a wide range of relevant reservoir properties and gauge metrology. The detailed workflow used to generate the reliability plots is presented in FIG. 7.

Starting with one value of skin and well bore storage constant, a combination of petrophysical and fluid PVT properties is taken as an input to generate an expected pressure response (theoretical, noise free) for a particular fluid flow rate profile (6 hr flow and 2 hr build up) using the well-established analytical solution of the diffusivity equation in the Laplace domain. The solution is generated considering a single phase fluid flow in a cylindrical source infinite acting reservoir.

$$\frac{\partial P_D}{\partial r_D^2} + \frac{1}{r_D}\frac{\partial P_D}{\partial r_d} = \frac{\partial P_D}{\partial t_D} \quad \text{(Eq. 1)}$$

Solution of Eq. 1 in Laplace domain is given as:

$$L\{P_D\} = \frac{K_o(\sqrt{p}) + S\sqrt{p}*K_1(\sqrt{p})}{P\{\sqrt{p}*K_1(\sqrt{p}) + C_D p[K_o(\sqrt{p}) + S\sqrt{p}*K_1(\sqrt{p})]\}} \quad \text{(Eq. 2)}$$

Figure 1:
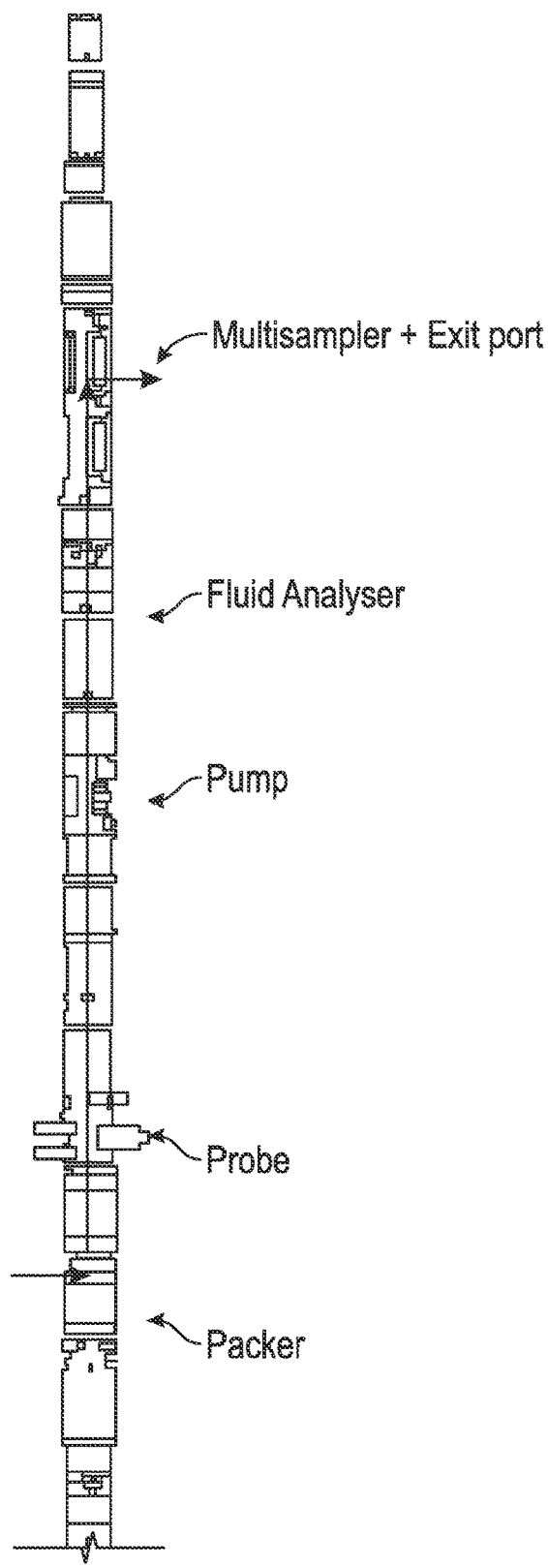
FIG. 1 is an illustration from an IPTT test performed using the formation tester tool that straddles an interval of the target reservoir rock and isolating the interval from the borehole hydraulic pressure.
Figure 2:
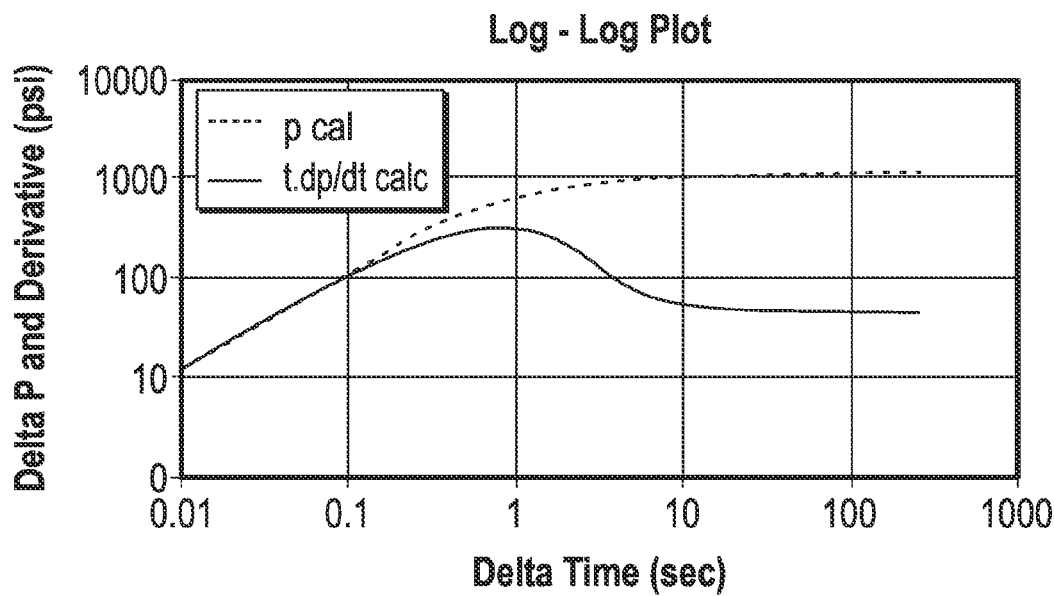
FIG. 2 is illustrates a typical Bourdet flow regime plot.
Figure 3:
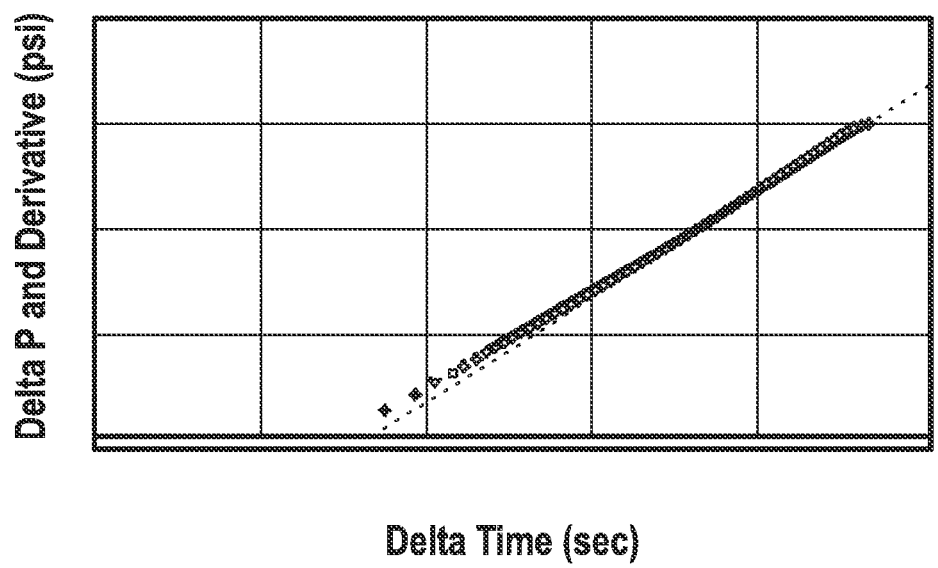
FIG. 3 is an illustration of formation and fluid properties of the tested interval in which radial flow regime may not initiate in reasonable time.
Figure 4:
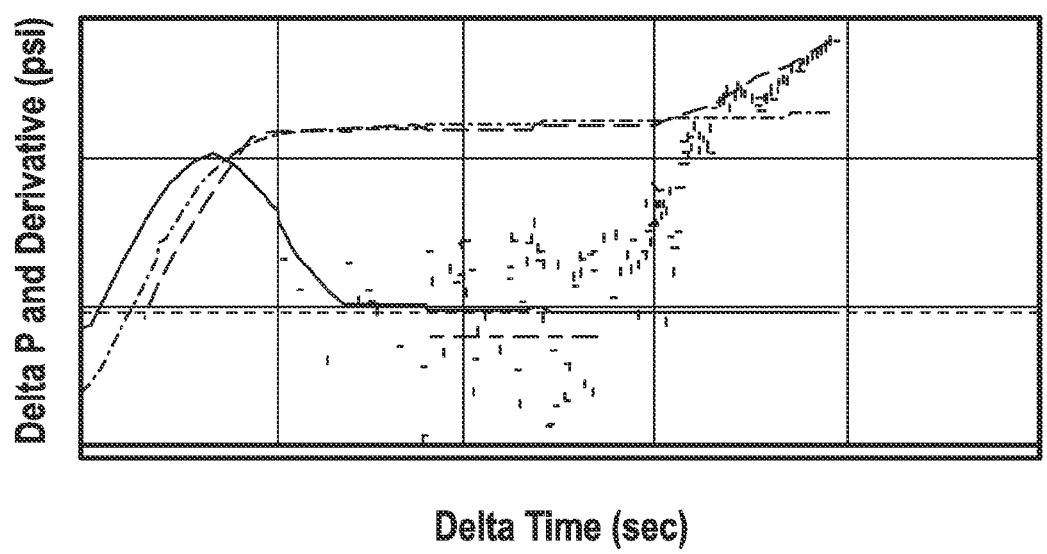
FIG. 4 is a derivative plot that renders reliable identification of radial flow.
Figure 5A:
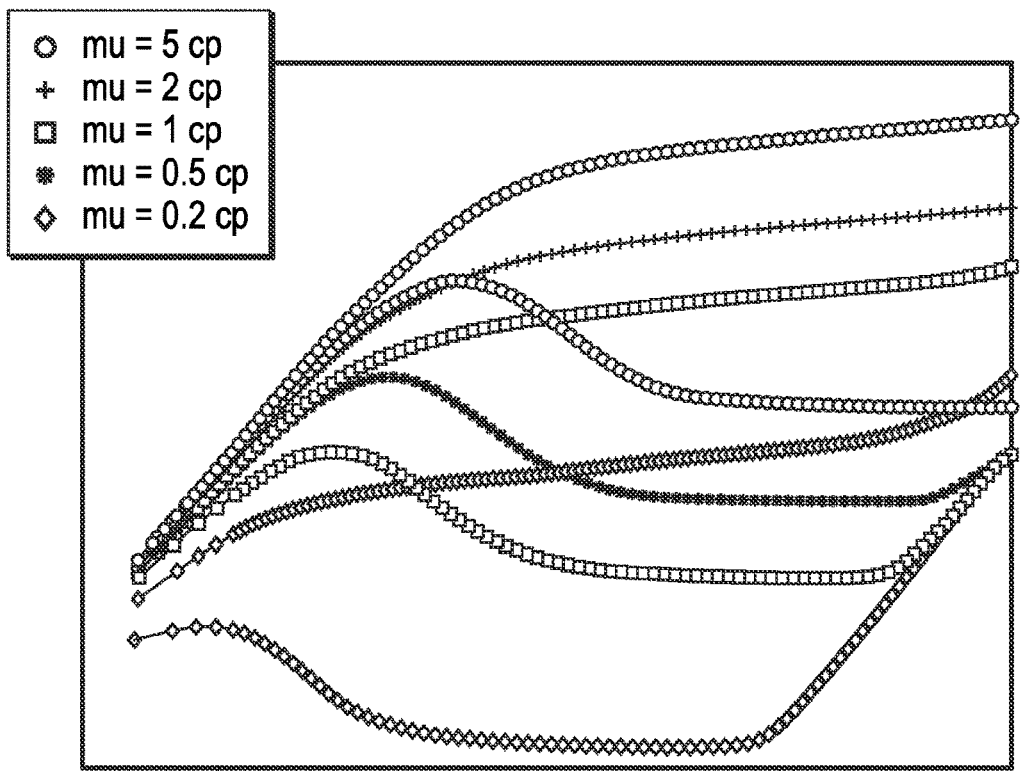
FIG. 5a illustrates that when the permeability is higher, the reservoir reacts faster, and the pressure derivative deviates quickly away from the unit slope storage line and attains the radial flow zero slope trend earlier.
Figure 5B:
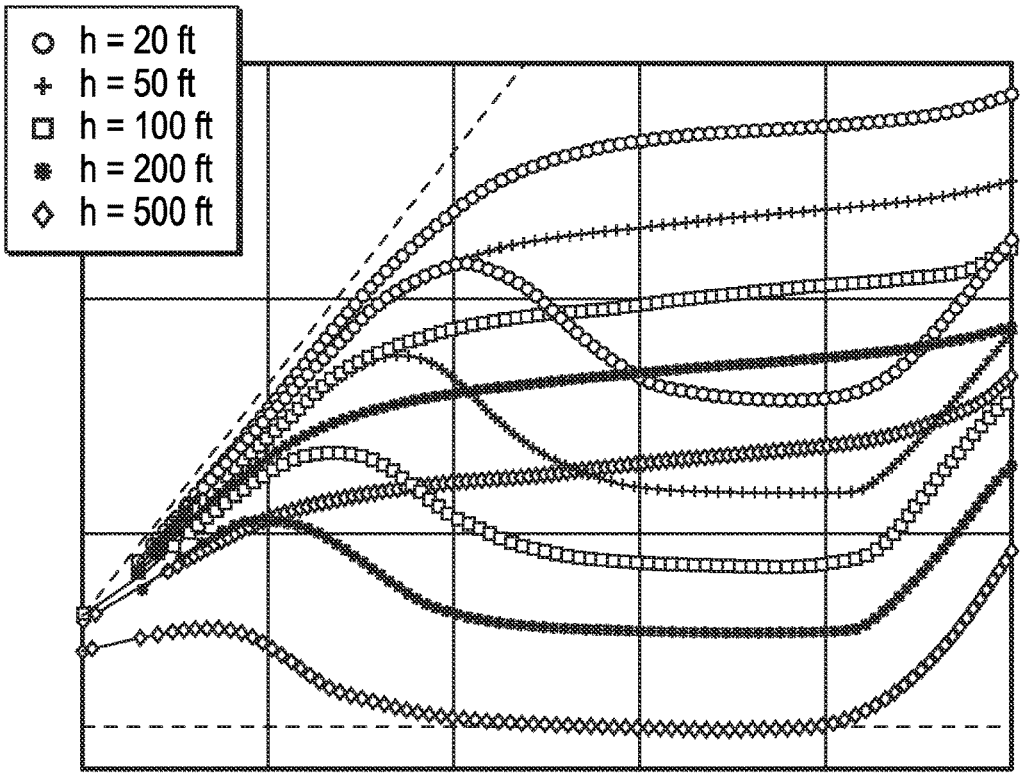
FIG. 5b illustrates that value of the radial flow derivative is inversely related to the permeability and that formation thickness has a similar effect on the pressure derivative.
Figure 5C:
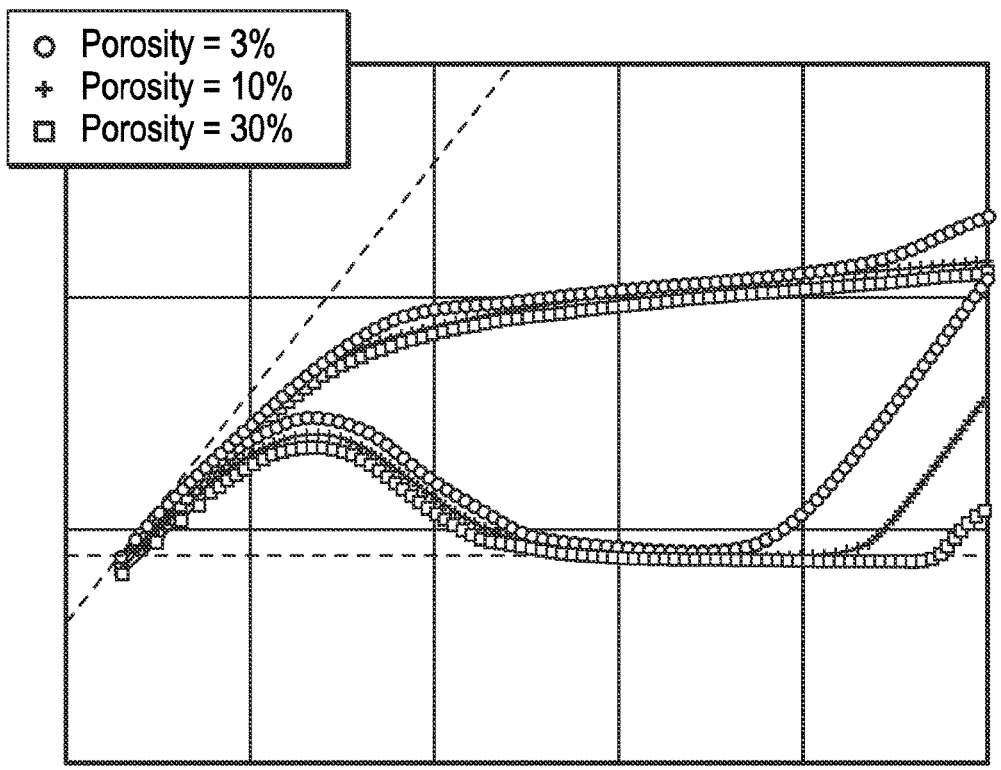
FIGS. 5(c) and 5(d) depict the effect of porosity and total compressibility respectively on the pressure derivative plot.
Figure 5D:
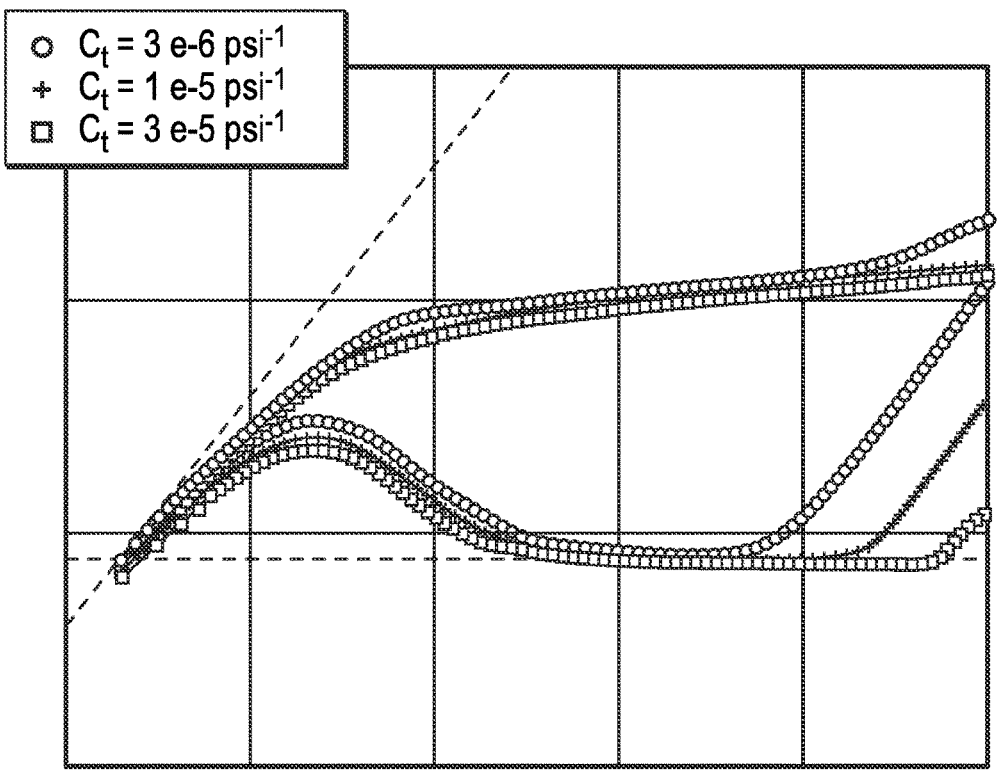
Figure 5E:
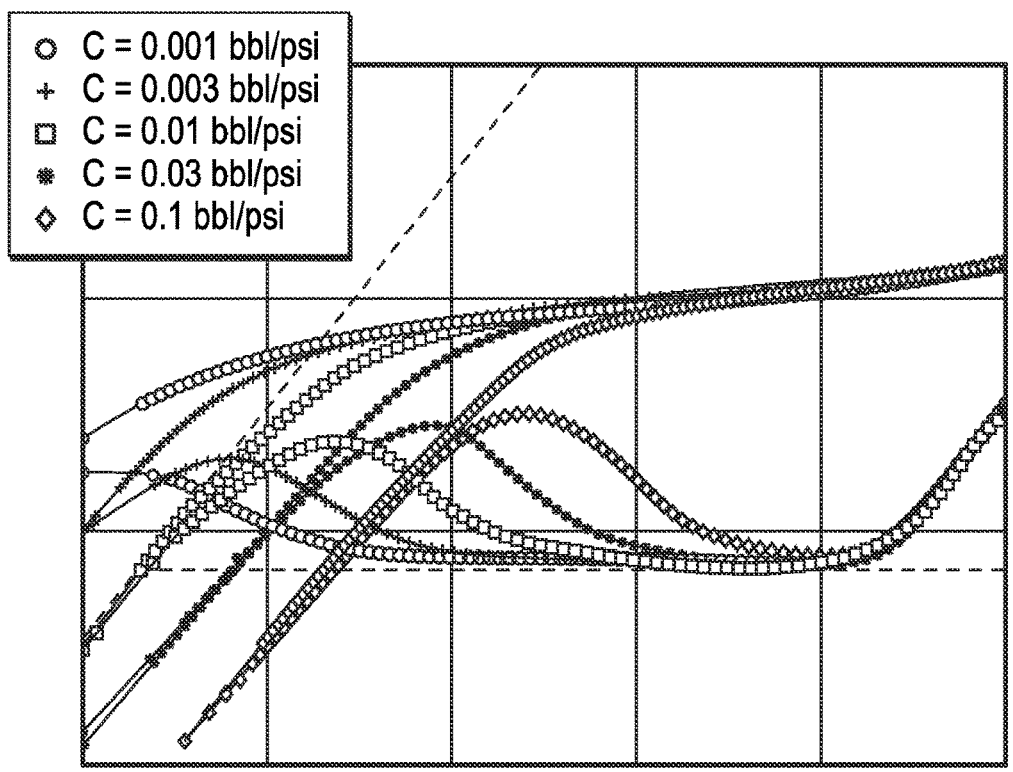
FIGS. 5(e) and 5(f) depict that well bore storage constant and skin influence the onset of the radial derivative significantly.
Figure 5F:
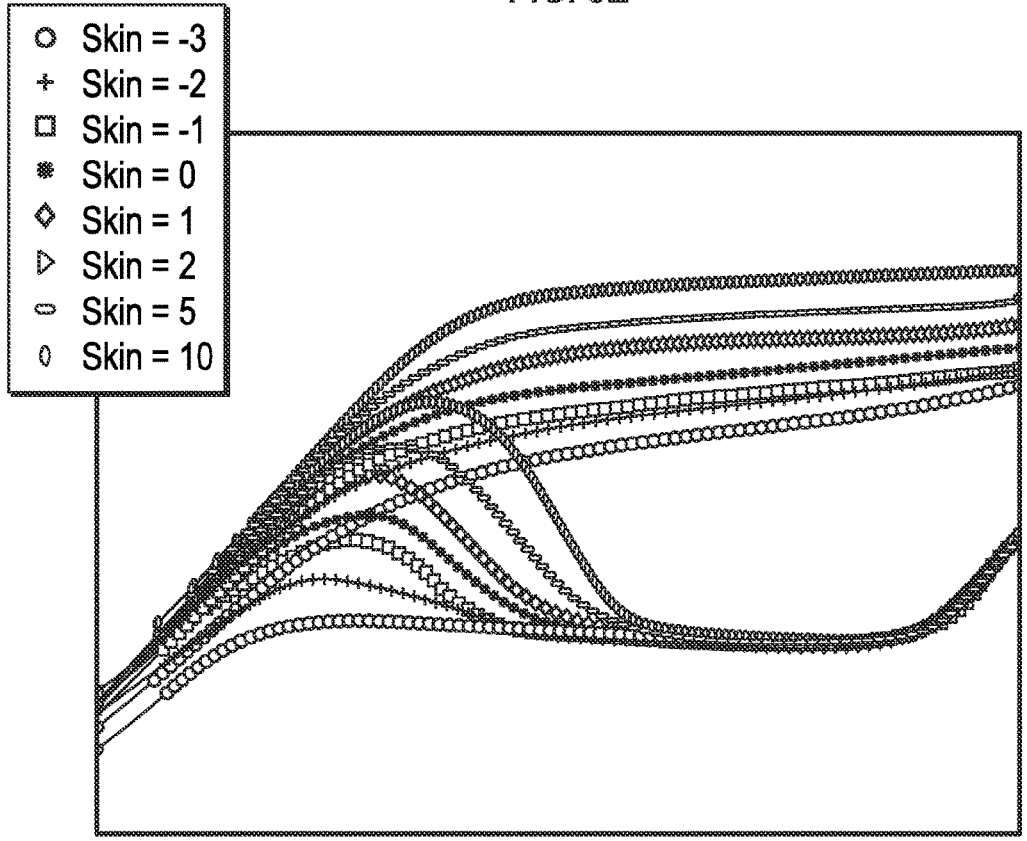
Figure 6:
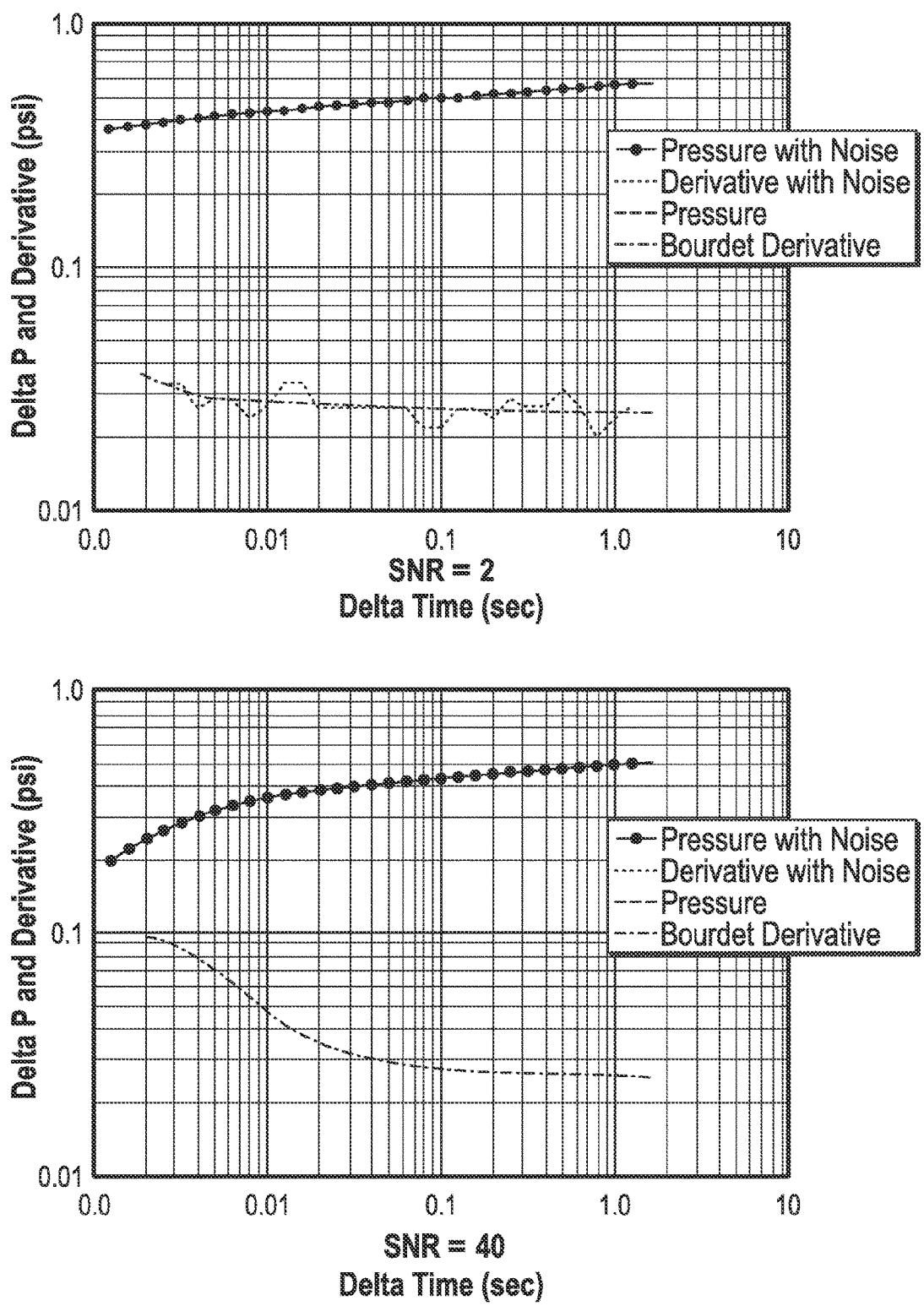
FIG. 6 illustrates that the effect of signal to noise ratio on the pressure signal distortion.
Figure 6:
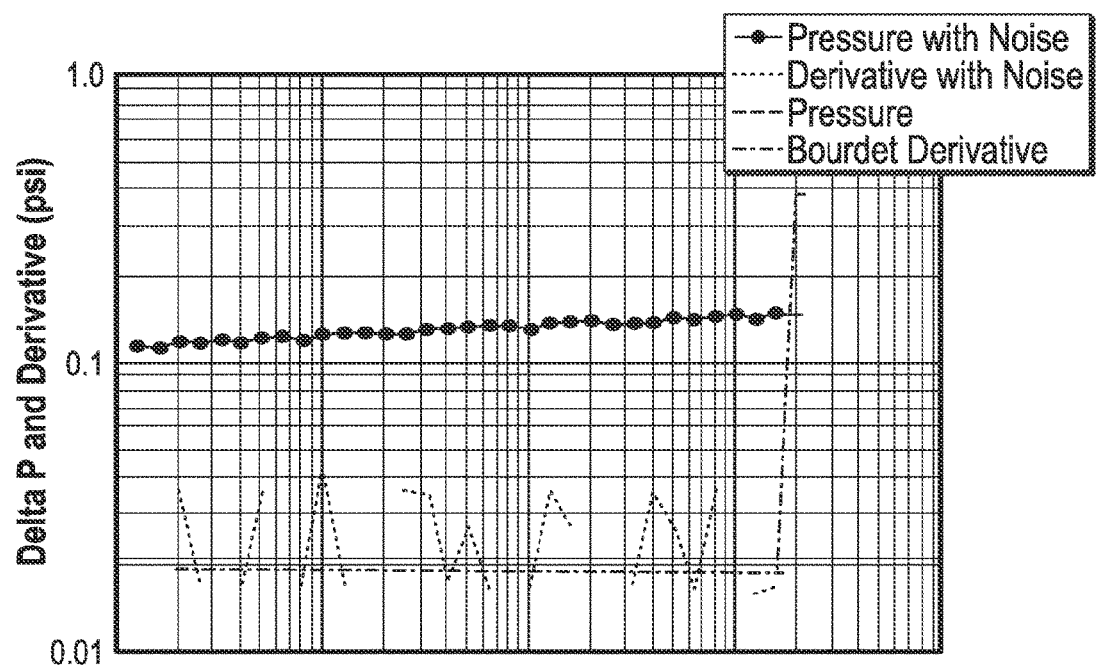
Figure 6:
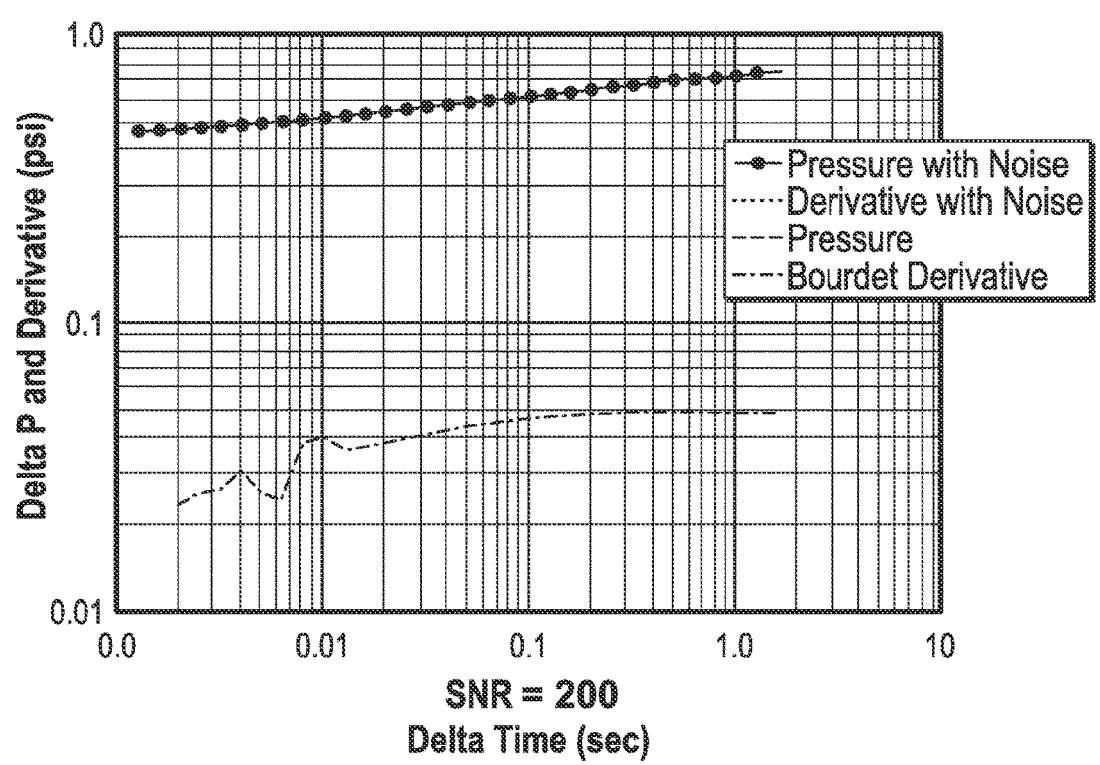

The buildup part of the theoretical pressure response is used to generate the theoretical Bourdet derivative response. A normally distributed random noise is then superimposed upon the derivative to simulate the effects of gauge metrology and noise from any other external source. In the next step, the noise superimposed derivative and the theoretical derivative are compared to estimate the extent of noise distortion on the theoretical derivative. The theoretical derivative is considered as the pure pressure signal and the noise superimposed derivative is taken as the expected pressure signal. In particular, the ratio of the theoretical derivative value to peak-to-peak value of the noisy derivative is used to calculate the signal to noise ratio. A signal to noise ratio of 40 is used as a cut-off to define if the noise has distorted the pure signal significantly. This value if based on the observations as presented in FIG. 6. A signal to noise ratio of 40 gives a reasonable and identifiable flow regime while also preserving the derivative profile.

Thus, at the end of this step, we can estimate if an identifiable radial flow regime is expected for a particular set of reservoir parameters. The process is repeated over a wide range of reservoir parameters and flow rates. The data is populated as a table with three categories for each set of parameters: radial flow onset not achieved; radial flow achieved but not clearly identifiable because of noise; and identifiable radial flow achieved.

In order to present the results on a two dimensional plot, all of the relevant parameters are clubbed into two groups on the basis of their effect on the pressure derivative plot. The parameters are coupled in such a way that the two groups are very similar to the dimensionless variables widely used in well testing literatures.

$$\alpha = K*h/q*B*\mu(1/\text{psi}) \quad \text{(Eq. 3)}$$

$$\beta = 1/\Phi*Ct*r2w(\text{psi/sq.ft}) \quad \text{(Eq. 4)}$$

Where,
K=Permeability
Φ=Porosity
h=Formation thickness
Ct=Total compressibility
q=Fluid flow rate
μ=Viscosity of the flowing fluid
rw=Well bore radius The coupled parameters are plotted on the co-ordinate plane with points as (β, α) to give a reliability plot. The three categories defined for radial flow regime identification thus transforms into three corresponding regions on the reliability plot.

The shaded area (region "c") represents the combination of petrophysical and fluid properties where reasonable radial flow regime can be observed for a particular skin and fluid flow rate.

Region "a" represents the combination of parameters for which onset of radial flow regime will not be achieved when subjected to the considered flow history. Similarly, for combination of parameters which lie in the "b" region, radial flow will be achieved but will be ambiguous because of high noise.

Figure 8:
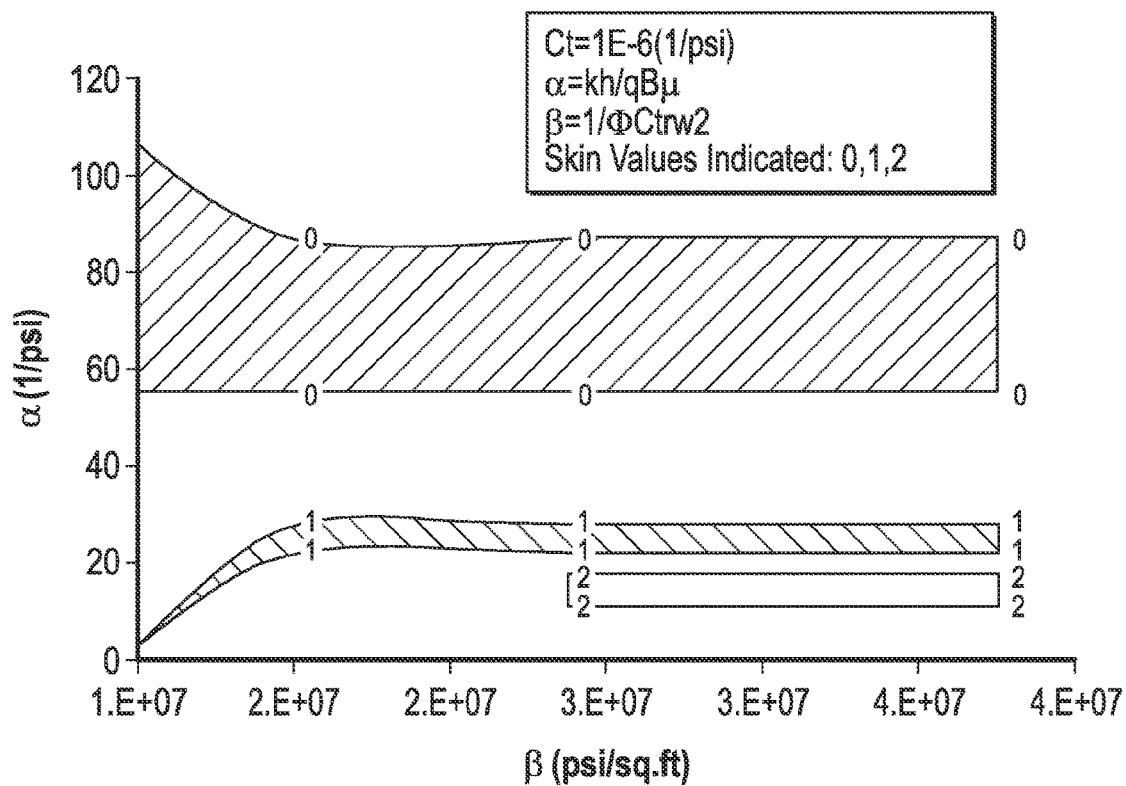
FIG. 8 is reliability plot for multiple values of skin.

Several bands with different value of skin can be simulated and plotted as shown in FIG. 8. Similarly bands can also be generated to account for the uncertainties in the well bore storage constant value. The presented plots are based on a six hour flow and two hour build up flow history; however, the methodology can also be extended for different flow history scenarios using the principle of superposition.

These plots can be used not only to estimate the acquisition quality for any IPTT operations, but also to propose mitigation measures to improve the data quality. In the planning stages of IPTT, an estimate of the reservoir parameters can be done on the basis of logs and fluid data. The uncertainties associated with these data can be used to calculate a range of ($\beta$, $\alpha$) coupled parameters. The position of the range of ($\beta$, $\alpha$) on the corresponding two dimensional reliability plot can be used to estimate if the IPTT is will be successful or not.

Figure 9:
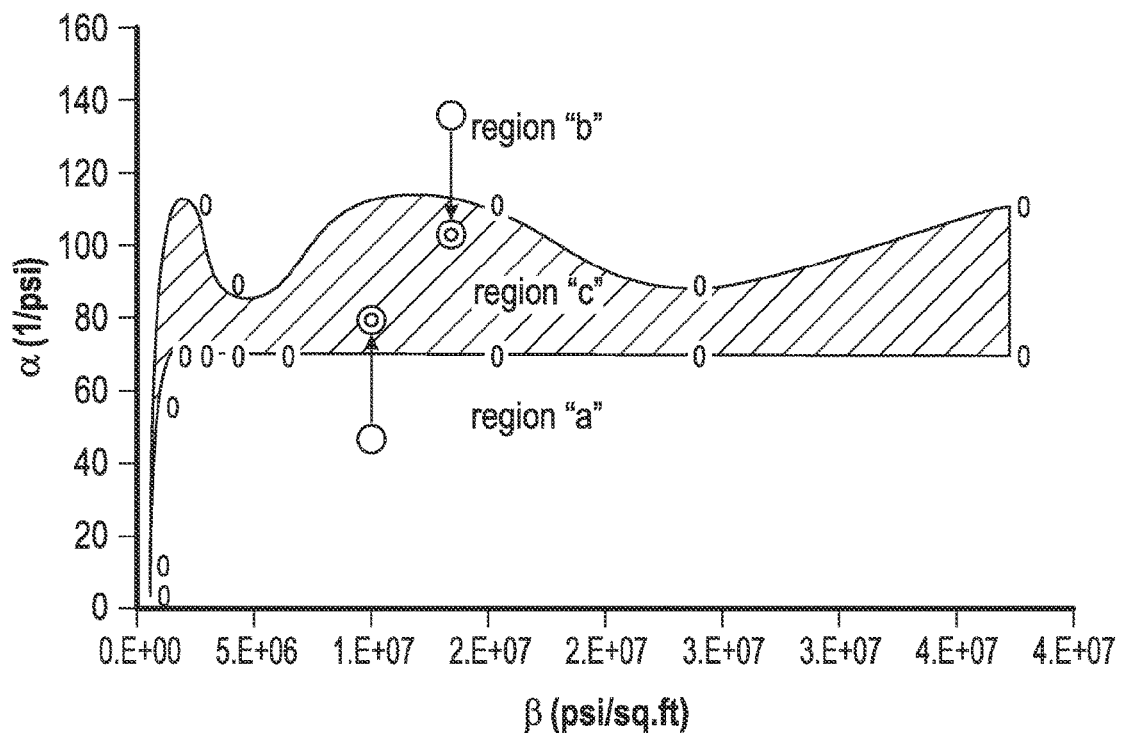
FIG. 9 is a plot showing flow rate used to optimize the IPTT acquisition.

The parameter "$\alpha$" is inversely proportional to the fluid flow rate during testing. Thus, the flow rate, a controllable parameter, can be used to optimize the IPTT acquisition as shown in FIG. 9. If the initial estimation of formation and fluid properties indicate that the coupled parameter combination ($\beta$, $\alpha$) lie in the "b" region, then the testing flow rate should be increased so as to decrease the value of "$\alpha$" and get the ($\beta$, $\alpha$) combination in the "c" region. Similarly, decreasing the rate will be favorable for cases where the initial estimate of ($\beta$, $\alpha$) lies in the "a" region.

Figure 10:
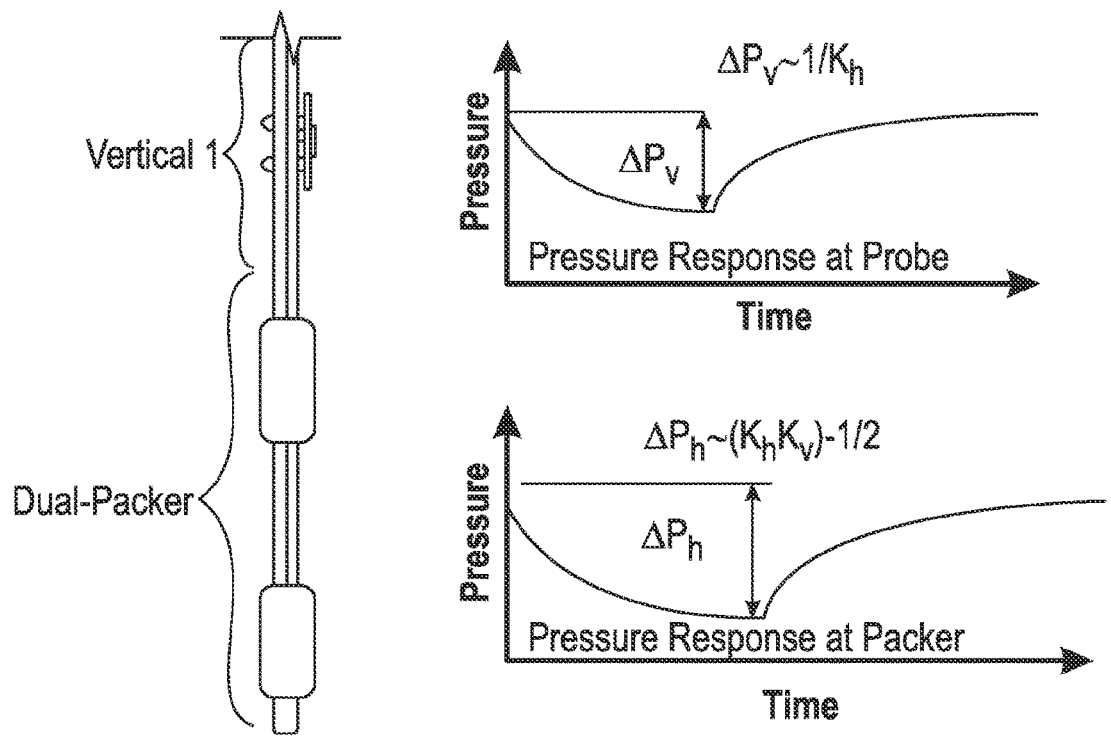
FIG. 10 is a vertical probe and packer combination improving IPTT data acquisition.
Figure 10:
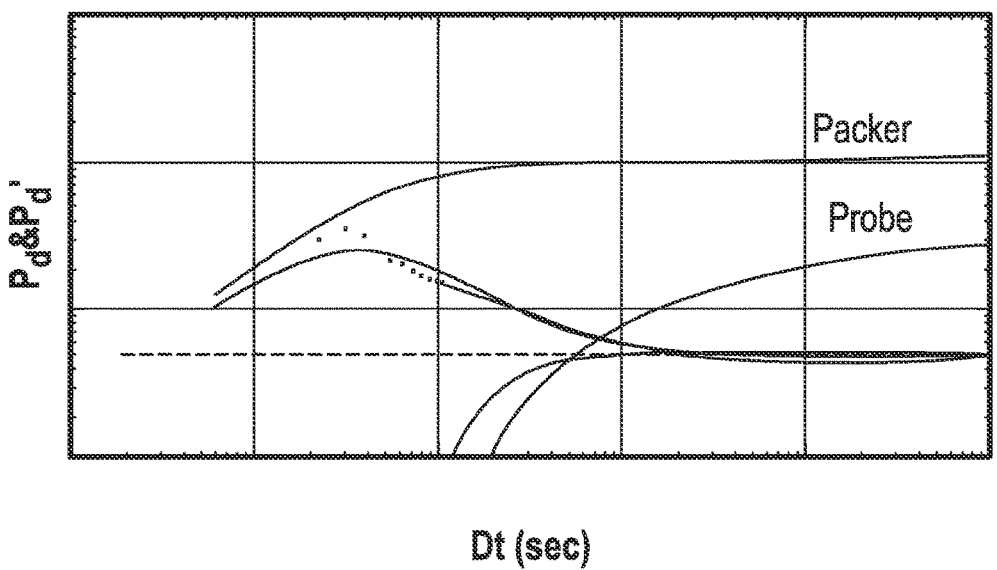
Figure 11:
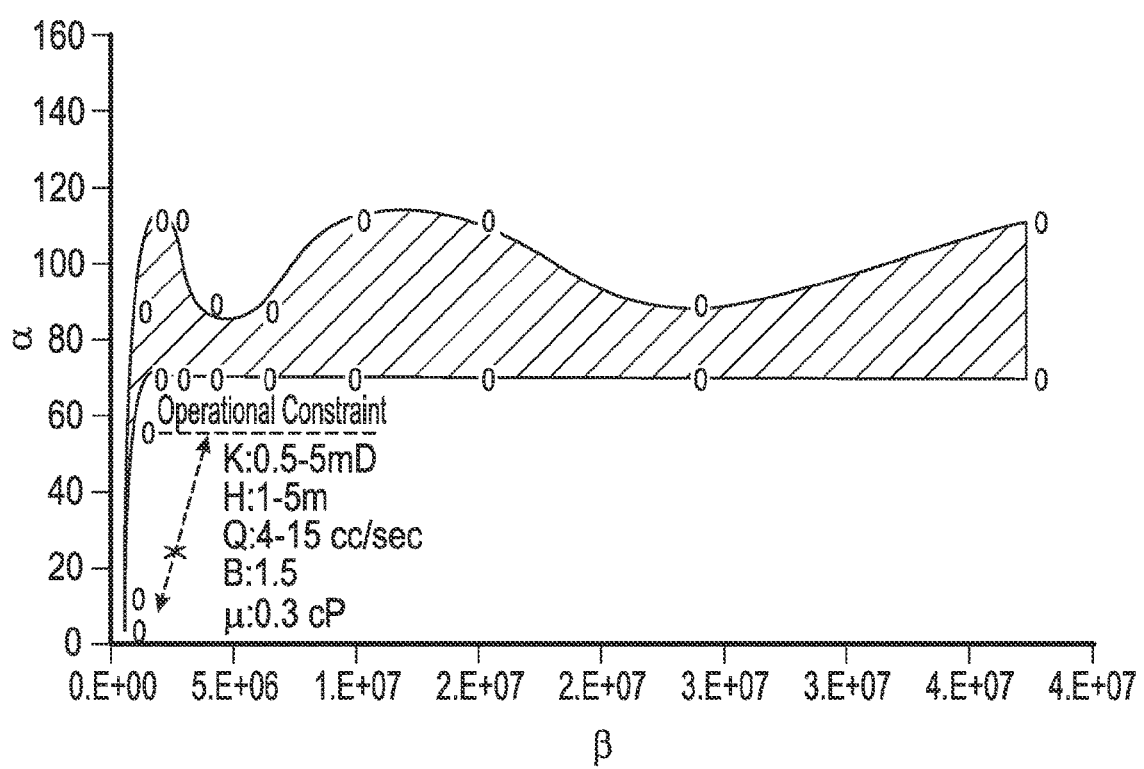
FIG. 11 is radial flow regime indication on a reliability plot used for job planning.
Figure 12:
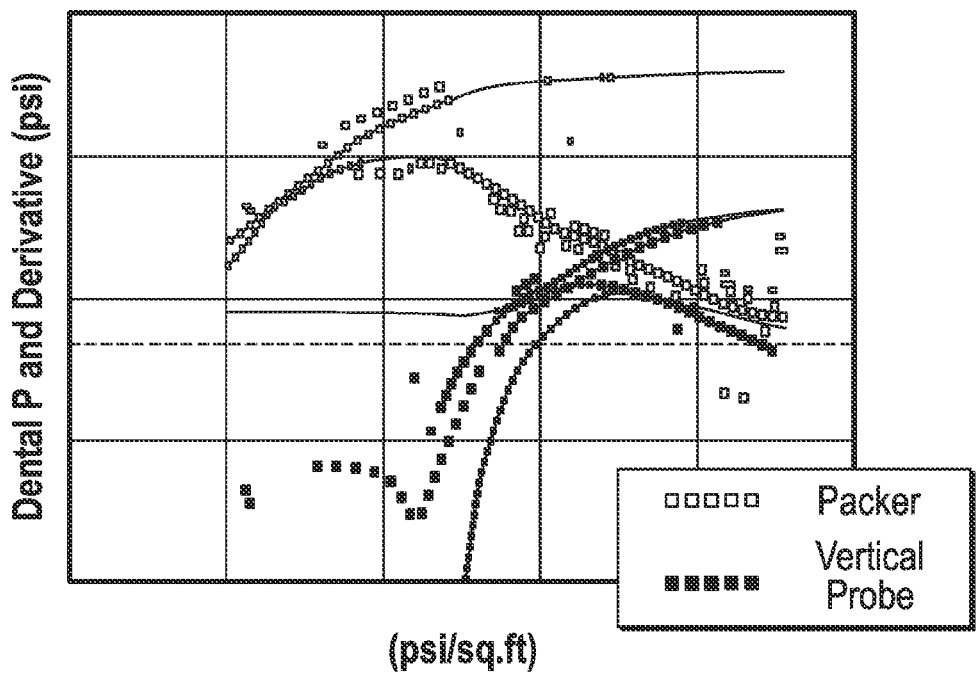
FIG. 12 is a spherical flow regime plot observed on packer and probe.
Figure 13:
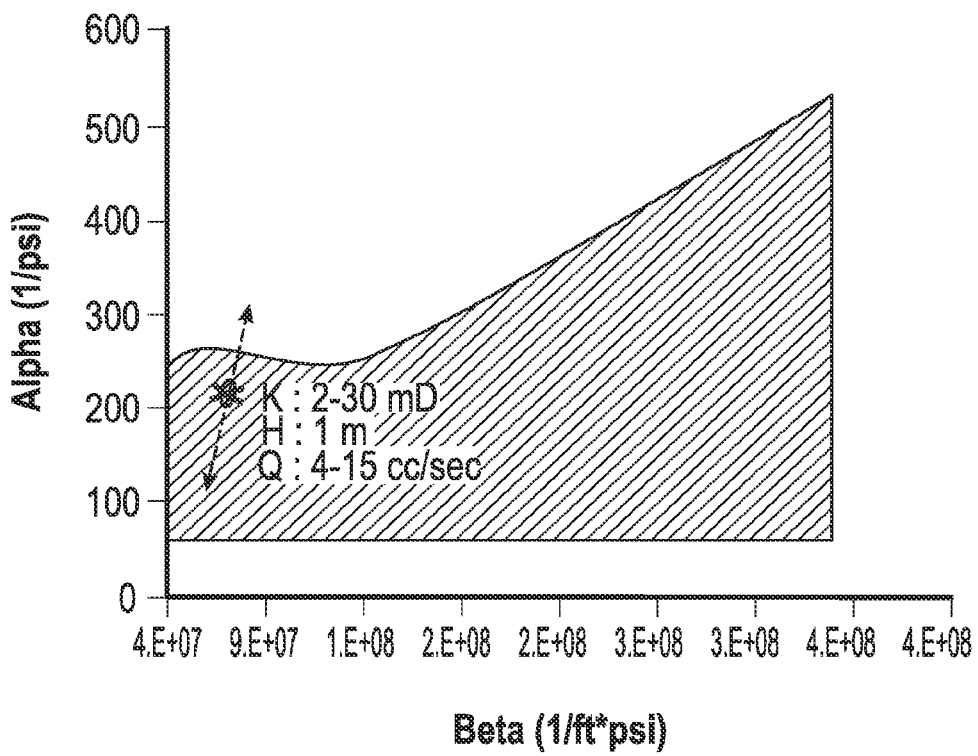
FIG. 13 is a plot of a radial flow regime indication on the reliability plot during job planning.

However, there are operational limitations on the minimum and maximum flow rate that can be achieved during the IPTT operations. An independent pressure transient measurement in the tested zone can be used to reduce the interpretation uncertainty. This can be achieved by the use of a vertical probe along with the straddling packer as shown in FIG. 10.

IPTT in this combination involves flowing the tested interval through the dual packer and acquiring the corresponding pressure response at the dual packer and the vertical probe. The pressure response at the vertical probe is inversely related to the horizontal permeability while the pressure response at the dual packer is inversely proportional to the square root of the vertical and horizontal permeability product.

Thus the pressure measurement at the probe provides an independent source of estimating permeability and affirming the pressure derivative profile at the dual packer. This significantly enhances the interpretation reliability of IPTT.

Experimental Results 1: IPTT for Completion Optimization

The objective of the IPTT was to get a representative value of the formation permeability. The measured permeability was a critical input for designing an optimum well completion in the complex carbonate environment.

In the planning stage of the IPTT, an initial estimate of the coupled parameters ($\beta$, $\alpha$) was made was made using the open hole log data. On plotting the estimated value on the reliability plot and considering the uncertainties associated in the initial estimates of the log derived formation properties, it was found that even with rate changes within the operational limits the test could not be optimized to allow development of the radial flow regime in a reasonable time. Thus, a vertical probe was included as a part of the IPTT operation.

IPTT was done in the tested interval and, as predicted by the reliability plot, radial flow regime could not be observed on the pressure derivative of the dual packer. Estimating formation properties only on the basis of pressure transient analysis of the dual packer data would lead to high uncertainties. However, spherical flow regime, negative half slope line, was observed on both dual packer derivative and vertical probe derivative. The flow regime profile observed on both the pressure derivatives gave enough information to estimate reliable tested zone properties, including permeability.

Experimental Results 2: IPTT for Productivity

Well X was drilled in an exploratory block located onshore. Basic logging was done in the well and a one-meter thick potential gas zone was identified. IPTT was done to establish the productivity of the zone and to serve as a go/no-go for extensive well testing.

Based on the open hole logging measurements, an initial estimate of the reservoir properties was made. The reliability plot for gas was used to predict the expected data quality of the IPTT. The coupled parameters along with associated uncertainties indicated that the dual packer pressure transient analysis would yield a clearly identifiable radial flow regime.

Figure 14:
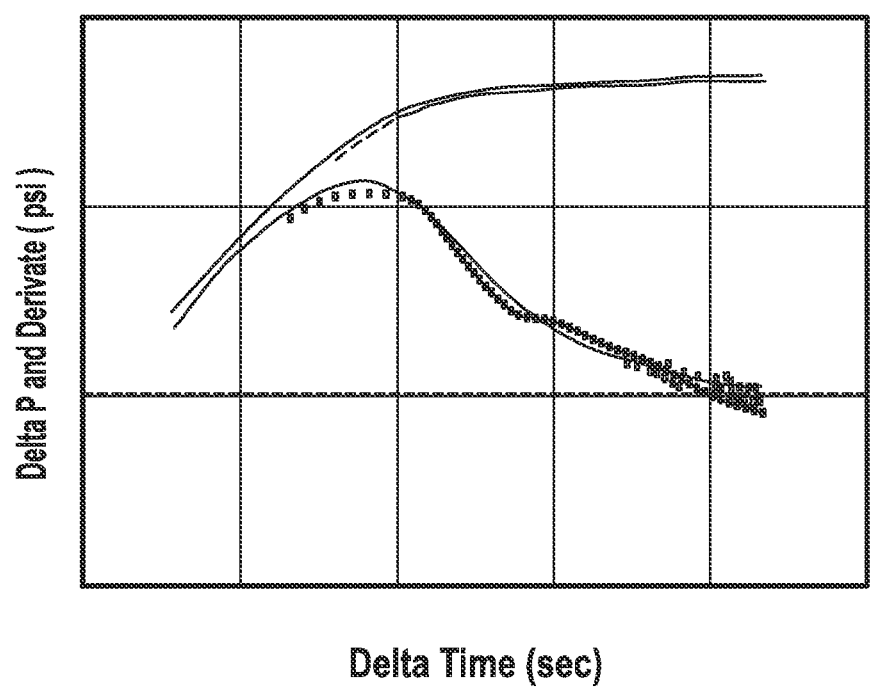
FIG. 14 is a plot illustrating radial flow identified on a derivative plot.

Radial flow was clearly identified during the IPTT operations; refer to FIG. 14. A flow after flow was also done along with sampling during the IPTT operation. The productivity estimates from the single point absolute open flow potential based on pressure transient analysis was found to be consistent with productivity estimates obtained from the flow after flow inflow performance relationship (IPR) method. The productivity indicated that the zone did not have an economic potential and, hence, extensive well testing was not required.

Increasingly, operators are moving towards IPTT as a precursor to conventional testing. IPTT design, especially in an exploratory environment with limited estimation of the petrophysical and fluid PVT properties, is a challenge. The present disclosure introduces a methodology to estimate the reliability of IPTT in the design stage itself and access risks. These risks can be mitigated by various measures which may lead to a successful IPTT test.

In one example embodiment, s method to obtain a reliability of an interval pressure transient test is disclosed comprising: obtaining an analytical pressure profile for a given formation; generating a random noise profile; superimposing the random noise profile on the analytical pressure profile for the given formation; generating a derivative of the analytical pressure profile for the given formation; generating a noise superimposed pressure derivative from the superimposed random noise profile; and estimating the reliability of the interval pressure transient test based on the derivative of the analytical pressure profile and the noise superimposed pressure derivative. In another embodiment, an article of manufacture is disclosed, comprising a component with a non-volatile memory component configured to store and perform instructions related to a method to obtain a reliability of an interval pressure transient test, comprising: obtaining an analytical pressure profile for a given formation; generating a random noise profile; superimposing the random noise profile on the analytical pressure profile for the given formation; generating a derivative of the analytical pressure profile for the given formation; generating a noise superimposed pressure derivative from the superimposed random noise profile; and estimating the reliability of the interval pressure transient test based on the derivative of the analytical pressure profile and the noise superimposed pressure derivative. Such article of manufacture may be in the form of a computer disk, memory stick, computer or other embodiment. In the methods and article of manufacture described wherein the estimating the reliability of the interval pressure transient test is achieved by quantifying an effect of the noise on the derivative of the analytical pressure profile of the given formation.

The method may also be accomplished wherein the derivative is a Bourdet derivative. The method may also be accomplished wherein the estimating the reliability is achieved by comparing the derivative of the analytical pressure profile and the noise superimposed pressure derivative to estimate an extent of noise distortion on the derivative of the analytical pressure profile. The method may also be accomplished wherein the estimating the reliability further comprises evaluating a signal to noise ratio. Additionally, the method may be accomplished wherein a successful test is a signal to noise ratio below 40.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
    obtaining an analytical pressure profile for a formation using a set of parameters describing a state of the formation;
    generating a random noise profile;
    superimposing the random noise profile on the analytical pressure profile for the formation to obtain a superimposed random noise profile;
    generating a derivative of the analytical pressure profile for the formation;
    generating a noise superimposed pressure derivative from the superimposed random noise profile;
    estimating a reliability of an interval pressure transient test based on the derivative of the analytical pressure profile and the noise superimposed pressure derivative; and
    facilitating an adjustment to a formation test performed using a formation tester tool deployed to the formation based, at least in part, on the reliability of the interval pressure transient test.

2. The method according to claim 1, wherein the estimating the reliability of the interval pressure transient test is achieved by quantifying an effect of the noise on the derivative of the analytical pressure profile of the formation.

3. The method according to claim 1, wherein the derivative is a Bourdet derivative.

4. The method according to claim 1, wherein the estimating the reliability is achieved by comparing the derivative of the analytical pressure profile and the noise superimposed pressure derivative to estimate an extent of noise distortion on the derivative of the analytical pressure profile.

5. The method according to claim 4, wherein the estimating the reliability further comprises evaluating a signal to noise ratio.

6. The method according to claim 5, wherein a successful test is a signal to noise ratio below 40.

7. The method of claim 1, wherein the adjustment to the formation test comprises setting a testing fluid flow rate profile of a formation tester tool, adding an independent pressure transient measurement, or a combination thereof.

8. The method of claim 1, wherein the method is performed in the recited order.

9. A system, comprising;
    a formation tester tool; and
    a component with a non-volatile memory component connected to the formation tester tool and configured to store and perform instructions related to a method to obtain a reliability of an interval pressure transient test, comprising:
        obtaining an analytical pressure profile for a given formation;
        generating a random noise profile;
        generating a derivative of the analytical pressure profile for the given formation;
        generating a noise superimposed pressure derivative by superimposing the random noise profile on the derivative of the analytical pressure profile;
        estimating the reliability of the interval pressure transient test based on the derivative of the analytical pressure profile and the noise superimposed pressure derivative; and
        using the estimated reliability to adjust a testing fluid flow rate profile of the formation tester tool.

10. The system according to claim 9, wherein the component is further configured such that the estimating the reliability of the interval pressure transient test is achieved by quantifying an effect of the noise on the derivative of the analytical pressure profile of the given formation.

11. The system according to claim 9, wherein the component is further configured such that the method performed is accomplished by a Bourdet derivative.

12. The system according to claim 9, wherein the component is further configured such that the estimating the reliability is achieved by comparing the derivative of the analytical pressure profile and the noise superimposed pressure derivative to estimate an extent of noise distortion on the derivative of the analytical pressure profile.

13. The system according to claim 12, wherein the estimating the reliability further comprises evaluating a signal to noise ratio.

14. The system according to claim 13, wherein a successful test is a signal to noise ratio below 40.

15. The system of claim 9, wherein the method to obtain the reliability of the interval pressure transient test is performed in the recited order.

* * * * *